US009389483B2

(12) United States Patent
Kung et al.

(10) Patent No.: US 9,389,483 B2
(45) Date of Patent: Jul. 12, 2016

(54) CONTINUOUS SPECTRUM GENERATION APPARATUS AND ASSEMBLING METHOD THEREOF

(71) Applicant: National Tsing Hua University, Hsinchu (TW)

(72) Inventors: Andrew Hing-Cheong Kung, Hsinchu (TW); Chih-Hsuan Lu, Pingtung County (TW)

(73) Assignee: National Tsung Hua University, Hsinchu (TW)

( * ) Notice: Subject to any disclaimer, the term of this patent is extended or adjusted under 35 U.S.C. 154(b) by 0 days.

(21) Appl. No.: 14/686,791

(22) Filed: Apr. 15, 2015

(65) Prior Publication Data

US 2016/0161825 A1   Jun. 9, 2016

(30) Foreign Application Priority Data

Dec. 9, 2014  (TW) .............................. 103142809 A
Apr. 10, 2015  (TW) .............................. 104111594 A (51) Int. Cl.
*G11B 7/00* (2006.01)
*G03B 27/54* (2006.01)
(Continued)

(52) U.S. Cl.
CPC ............ *G02F 1/3501* (2013.01); *G02B 26/007* (2013.01); *G02B 27/0075* (2013.01);
(Continued)

(58) Field of Classification Search
CPC .... G02B 27/283; G02B 5/3025; G02B 5/124; G02B 5/3016; G02B 5/3066; G02B 5/3083; G02B 6/264; G02B 6/32; G02B 26/00; G02B 26/007; G02B 27/09; G02B 27/0025; G02B 27/0075; G02B 7/1392; G02B 7/1398; B23K 26/0626; B23K 26/409; B29C 55/023; B29D 11/00; B29K 2995/003; B29K 2995/0034; G02F 1/133536; G02F 1/353; G02F 2001/3528; B60R 1/00; B60R 2300/103; B60R 2300/106; B60R 2300/8053; G01N 21/3554; G01N 21/359; H04N 5/30; H04N 5/33; G11B 27/3027; G11B 20/10481; G11B 2220/216; G11B 2220/218; G11B 2220/2525; G11B 2220/2545; G11B 27/24; G11B 7/00; G11B 7/00745; G11B 7/24082
See application file for complete search history.

(56) References Cited

U.S. PATENT DOCUMENTS 5,559,634 A  *  9/1996  Weber ................. G02B 5/3066
                                            359/485.04
6,055,220 A  *  4/2000  Mamin ................. B82Y 10/00
                                            369/112.23

(Continued)

FOREIGN PATENT DOCUMENTS

CN  101827662  9/2010
CN  103022867  4/2013

(Continued)

OTHER PUBLICATIONS

Chih-Hsuan Lu, et al., "A new and improved approach to supercontinuum generation in solids," CLEO: 2014 Laser Science to Photonic Applications. Technical Conference, Jun. 12, 2014.

(Continued)

*Primary Examiner* — Dionne H Pendleton
(74) *Attorney, Agent, or Firm* — Jianq Chyun IP Office (57) ABSTRACT

A continuous spectrum generation apparatus including a laser light source and a plurality of condensed state transparent plates is provided. The laser light source is configured to emit a laser beam. The condensed state transparent plates are disposed on the transmission path of the laser beam in sequence, and configured to successively extend the spectral bandwidth of the laser beam in sequence. An assembling method of a continuous spectrum generation apparatus is also provided.

18 Claims, 3 Drawing Sheets

(51) Int. Cl.
*G02F 1/35* (2006.01)
*H01S 3/00* (2006.01)
*G02F 1/355* (2006.01)
*G02B 26/00* (2006.01)
*G02B 27/00* (2006.01)
*G02B 6/32* (2006.01)

(52) U.S. Cl.
CPC .............. *G02F1/3551* (2013.01); *H01S 3/005* (2013.01); *G02B 6/32* (2013.01); *G02F 2001/3507* (2013.01); *G02F 2001/3528* (2013.01)

(56) References Cited

U.S. PATENT DOCUMENTS

| | | | | |
|---|---|---|---|---|
| 6,096,375 | A * | 8/2000 | Ouderkirk | B29C 55/023 359/487.02 |
| 7,245,805 | B2 | 7/2007 | Alfano et al. | |
| 8,731,009 | B2 | 5/2014 | Buchter | |
| 2002/0171817 | A1* | 11/2002 | Babonneau | B82Y 10/00 355/67 |
| 2003/0001991 | A1* | 1/2003 | Faris | G02B 5/3016 349/98 |
| 2005/0226577 | A1 | 10/2005 | Alfano et al. | |
| 2008/0049584 | A1* | 2/2008 | Tan | G02B 5/305 369/112.16 |
| 2009/0078870 | A1* | 3/2009 | Haruna | B60R 1/00 250/330 |
| 2012/0207007 | A1* | 8/2012 | Miyasaka | G02B 5/3025 369/112.16 |
| 2014/0330097 | A1* | 11/2014 | Weiss | A61B 5/1455 600/316 |
| 2015/0038313 | A1* | 2/2015 | Hosseini | B23K 26/0039 501/32 |

FOREIGN PATENT DOCUMENTS

| | | |
|---|---|---|
| TW | 200937005 | 9/2009 |
| TW | 201111890 | 4/2011 |
| TW | I358538 | 2/2012 |
| TW | I408481 | 9/2013 |

OTHER PUBLICATIONS

Andy Kung, "Synthesis of Single-Cycle Optical Fields," The 75th JSAP Autumn Meeting, 2014, Sep. 17, 2014.

Chih-Hsuan Lu, et al., "Generation of Intense Supercontinuum based on Multiple Plates of Fused Silica," The 5th International Symposium on Filamentation (COFIL2014), Sep. 18, 2014.

Yu-Jung Tsao, "Characterization of octave-spanning continuum generated from multiple SiO2 plates," Abstract of Thesis, Institute of Electro-Optical Engineering, National Tsing Hua University, 2014.

Hong-Yu Chen, et al., "Characterization of octave-spanning continuum generated from multiple SiO2 plates," Optics & Photonics Taiwan, the International Conference (OPTIC) 2014, Dec. 4-5, 2014, pp. 1-pp. 2.

Bo-Han Chen, et al., "Generation of Intense Supercontinuum in Condensed Media," Optics & Photonics Taiwan, the International Conference (OPTIC) 2014, Dec. 4-5, 2014, pp. 1-pp. 2.

Yu-Chen Cheng, et al., "Modeling of Multiple Plate Continuum Generation," Optics & Photonics Taiwan, the International Conference (OPTIC) 2014, Dec. 4-5, 2014, pp. 1-pp. 2.

Pin-Hsiang Wang, et al, "Characterization of octave-spanning continuum generated from multiple $SiO_2$ plates," Abstract of research article, Annual Meeting of the Physical Society of Republic of China, Jan. 28-30, 2015.

Chih-Hsuan Lu, et al., "Generation of Intense Supercontinuum in Condensed Media," Abstract of research article, Annual Meeting of the Physical Society of Republic of China, Jan. 28-30, 2015.

Yu-Chen Cheng, et al., "Modeling of Multiple Plate Continuum Generation," Abstract of research article, Annual Meeting of the Physical Society of Republic of China, Jan. 28-30, 2015.

Andy Kung, "MPContinuum, an Intense Supercontinuum Generated in Condensed Media," Abstract of research article, Annual Meeting of the Physical Society of Republic of China, Jan. 28-30, 2015.

Chih-Hsuan Lu, et al., "Generation of intense supercontinuum in condensed media," Optica, vol. 1, No. 6, Dec. 10, 2014, pp. 400-pp. 406.

Chih-Hsuan Lu, et al., "Generation of intense supercontinuum in condensed media," Conference on Lasers and Electro-Optics—European Quantum Electronics Conference(CLEO/Europe—EQEC 2015), Authors Notification, Mar. 23, 2015.

* cited by examiner

CONTINUOUS SPECTRUM GENERATION APPARATUS AND ASSEMBLING METHOD THEREOF

CROSS-REFERENCE TO RELATED APPLICATION

This application claims the priority benefit of Taiwan application Ser. No. 103142809, filed on Dec. 9, 2014 and Taiwan application Ser. No. 104111594, filed on Apr. 10, 2015. The entirety of the above-mentioned patent application is hereby incorporated by reference herein and made a part of this specification.

BACKGROUND OF THE INVENTION

1. Field of the Invention

The invention relates to a light source apparatus, and particularly relates to a continuous spectrum generation apparatus.

2. Description of Related Art

Through the development of laser and semiconductor technologies, light sources with high power and high optical efficiency are already realized. Compared with the continuous and wide light-emitting spectrum of the incandescent bulbs and fluorescent lamps, the laser and semiconductor light sources have a narrower light-emitting spectral bandwidth. In order to extend the applicability of the laser and semiconductor light sources, various technologies for increasing the spectral bandwidth are developed.

Generally speaking, a supercontinuum generation may be generated in gaseous, liquid, and solid-state media, and this phenomenon helps extend the spectral bandwidth of a laser beam. Most of the current high power supercontinuum generation technologies use a gaseous medium. However, since the gaseous medium has a lower density, the bandwidth-extending effect is only obvious when the gaseous medium is irradiated by a laser beam with a greater power compared to with condensed matter media. Alternatively, if a solid-state transparent bulk material is used to generate a supercontinuum, it is easy to generate multiple filaments in the laser beam when the input power is above a certain level that is typically 1000 times lower than used for the gas medium, which will eventually damage the solid-state transparent bulk material. Thus, the conventional supercontinuum generation technology has yet to generate a reliable high power supercontinuum with a condensed medium.

SUMMARY OF THE INVENTION

The invention provides a continuous spectrum generation apparatus capable of generating a reliable continuous spectrum with a preferable quality.

The invention provides an assembling method of a continuous spectrum generation apparatus for assembling a continuous spectrum generation apparatus capable of generating a reliable continuous spectrum with a preferable quality.

An embodiment of the invention provides a continuous spectrum generation apparatus including a laser light source and a plurality of condensed state transparent plates. The laser light source is configured to emit a laser beam. The condensed state transparent plates are disposed on a transmitting path of the laser beam in sequence, and are configured to successively and sequentially extend a spectral bandwidth of the laser beam.

According to an embodiment of the invention, one of the condensed state transparent plates closest to the laser light source is disposed at a position suitable to expand the spectral bandwidth of the laser beam.

According to an embodiment of the invention, one of the condensed state transparent plates closest to the laser light source is substantially disposed at a beam waist of the laser beam.

According to an embodiment of the invention, a distance from any one of the remainder of the condensed state transparent plates to the laser light source is greater than a distance from a position that the condensed state transparent plate generates multiple filamentation, and the distance is a distance along the transmitting path of the laser beam.

According to an embodiment of the invention, a photon energy of the laser beam emitted from the laser light source is less than or equal to a half of a bandgap of the condensed state transparent plate.

According to an embodiment of the invention, a photon energy of the laser beam emitted from the laser light source is greater than or equal to one-third of a bandgap of the condensed state transparent plate.

According to an embodiment of the invention, the condensed state transparent plate is a fused quartz glass plate.

According to an embodiment of the invention, a thickness of each of the condensed state transparent plates is less than or equal to 0.5 mm.

According to an embodiment of the invention, each of the condensed state transparent plates is disposed in a tilted state with respect to the laser beam.

According to an embodiment of the invention, an included angle between the normal of each of the condensed state transparent plates and the laser beam is a Brewster's angle.

An embodiment of the invention provides an assembling method of a continuous spectrum generation apparatus, including: providing a laser light source to emit a laser beam from the laser light source; disposing a first condensed state transparent plate on a transmitting path of the laser beam, and adjusting a position of the first condensed state transparent plate on the transmitting path of the laser beam to a position that extends a spectral bandwidth of the laser beam; and disposing at least one second condensed state transparent plate on the transmitting path of the laser beam from the first condensed state transparent plate, and adjusting a position of the second condensed state transparent plate on the transmitting path of the laser beam, wherein the second condensed state transparent plate is firstly adjusted to a first position that does not generate multiple filaments or cause optical damage, and then a distance between the second condensed state transparent plate and the first condensed state transparent plate is shortened to a second position that is the shortest distance and substantially does not generate the multiple filaments.

According to an embodiment of the invention, at least one second condensed state transparent plate includes a plurality of the second condensed state transparent plates, and position adjustment of any one of the second condensed state transparent plates except the second condensed state transparent plate closest to the first condensed state transparent plate includes: adjusting a position of the any one of the second condensed state transparent plates to a position that the laser beam from the previous second condensed state transparent plate does not generate multiple filaments, and then reducing a distance between any one of the second condensed state transparent plates and the previous second condensed state transparent plate to another position that is the shortest distance and substantially does not generate multiple filaments.

According to an embodiment of the invention, adjusting the position of the first condensed state transparent plate on the transmitting path of the laser beam to the position that extends the spectral bandwidth of the laser beam includes substantially adjusting the first condensed state transparent plate to a beam waist position of the laser beam.

According to an embodiment of the invention, a photon energy of the laser beam emitted from the laser light source is less than or equal to a half of a bandgap of each of the first condensed state transparent plate and the second condensed state transparent plate.

According to an embodiment of the invention, the photon energy of the laser beam emitted from the laser light source is greater than or equal to one-third of the bandgap of each of the first condensed state transparent plate and the second condensed state transparent plate.

According to an embodiment of the invention, the first condensed state transparent plate and the second condensed state transparent plate are quartz glass plates.

According to an embodiment of the invention, a thickness of the first condensed state transparent plate is less than or equal to 0.5 mm, and a thickness of the second condensed state transparent plate is less than or equal to 0.5 mm.

According to an embodiment of the invention, the first condensed state transparent plate is adjusted to a position tilted with respect to the laser beam, and the second condensed state transparent plate is adjusted to a position tilted with respect to the laser beam.

According to an embodiment of the invention, the first condensed state transparent plate is adjusted to a position where an included angle between the normal of the first condensed state transparent plate and the laser beam is a Brewster's angle, and the second condensed state transparent plate is adjusted to a position where an included angle between the normal of the second condensed state transparent plate and the laser beam is a Brewster's angle.

In the continuous spectrum generation apparatus according to the embodiments of the invention, since the condensed state transparent plates are disposed on the transmitting path of the laser beam in sequence to successively and sequentially extend the spectral bandwidth of the laser beam, the continuous spectrum generation apparatus may generate a reliable continuous spectrum with a preferable quality. In the assembling method of the continuous spectrum generation apparatus according to the embodiments of the invention, since the condensed state transparent plate is adjusted to the position that does not generate multiple filaments, the continuous spectrum generation apparatus assembled accordingly is capable of generating a reliable continuous spectrum with a preferable quality.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
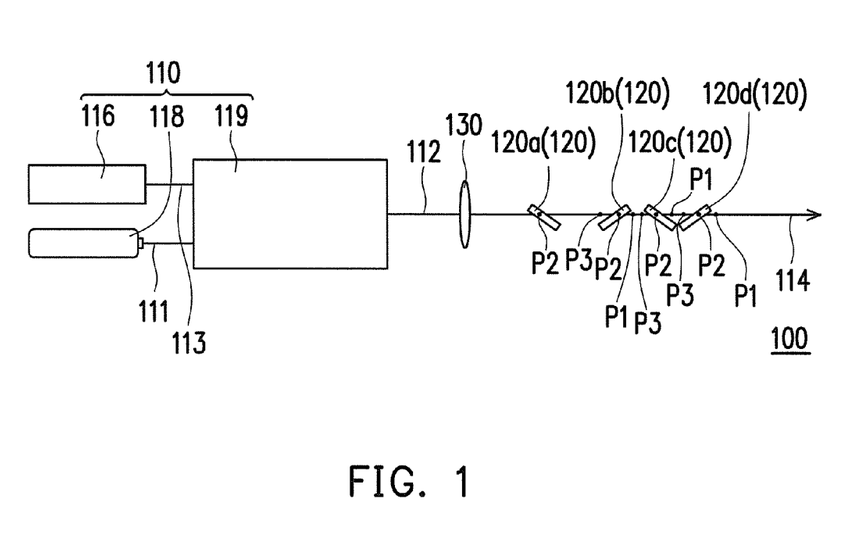
FIG. 1 is a schematic view illustrating an optical path of a continuous spectrum generation apparatus according to an embodiment of the invention.

FIG. 1 is a schematic view illustrating an optical path of a continuous spectrum generation apparatus according to an embodiment of the invention. Referring to FIG. 1, a continuous spectrum generation apparatus 100 includes a laser light source 110 and a plurality of condensed state transparent plates 120. The laser light source 110 is configured to emit a laser beam 112. The condensed state transparent plates 120 are disposed on a transmitting path of the laser beam 112 in sequence, and are configured to successively and sequentially extend a spectral bandwidth of the laser beam 112.

Specifically, one (i.e., the condensed state transparent plate 120a) of the condensed state transparent plates 120 closest to the laser light source 120 is disposed at a position suitable to extend the spectral bandwidth of the laser beam 112. For example, the continuous spectrum generation apparatus 100 further includes a convergent lens 130. The convergent lens 130 is disposed on the transmitting path of the laser beam 112 emitted from the laser light source 110 to converge the laser beam 112. In addition, the condensed state transparent plate 120a is substantially disposed near or at a beam waist of the laser beam 112.

Figure 2A:
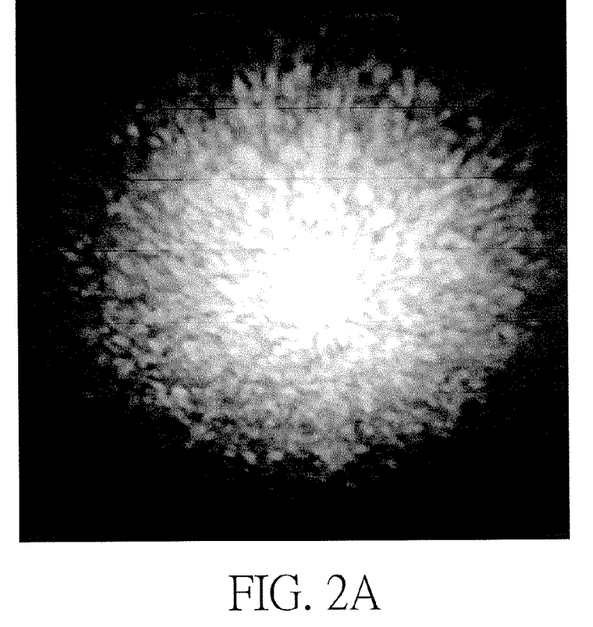
FIG. 2A is a view illustrating an image of a detected light beam when multiple filaments is generated.
Figure 2B:
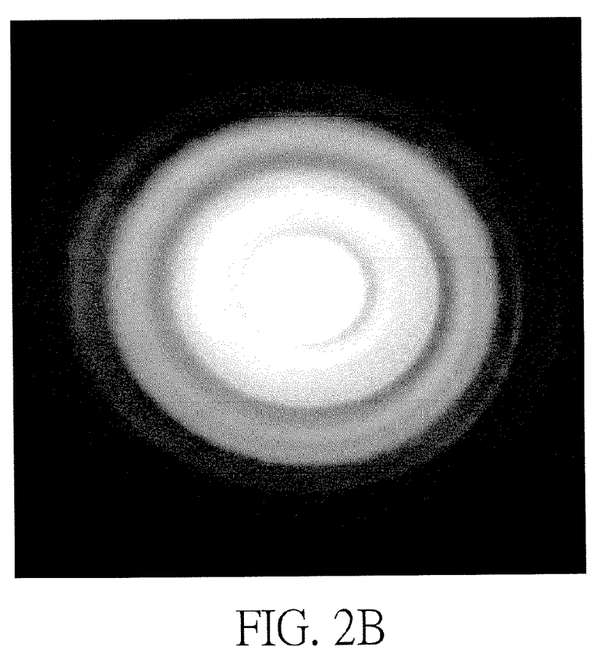
FIG. 2B is a view illustrating an image of a detected light beam output by the continuous spectrum generation apparatus shown in FIG. 1.

In addition, in this embodiment, a distance from any one of remainder (e.g., any one of the condensed state transparent plates 120b, 120c, and 120d) of the condensed state transparent plates 120 to the laser light source 110 is greater than a distance from a position that generates multiple filaments or cause material damage. And the distance is a distance along the transmitting path of the laser beam 112. In other words, if the transmitting path of the laser beam 112 is meandering, the distance is defined as a total path length along the meandering optical path. If the condensed state transparent plate 120 is disposed at the position that generates multiple filaments, an image of a light beam 114 with a continuous spectrum having an extended spectral bandwidth captured by an image sensor is as shown in FIG. 2A. A light intensity distribution along a cross-section of the light beam 114 is uneven and has several light intensity peaks. However, if the distance from the condensed state transparent plates 120 to the laser light source 110 is slightly greater than the distance from the position that generates the multiple filaments, multiple filamentation does not occur, and the light intensity distribution of the detected light beam 114 is as shown in FIG. 2B, which has a M-squared value closer to 1 than that of the distribution shown in FIG. 2A. In other words, the light beam 114 has a more preferable quality.

Figure 3:
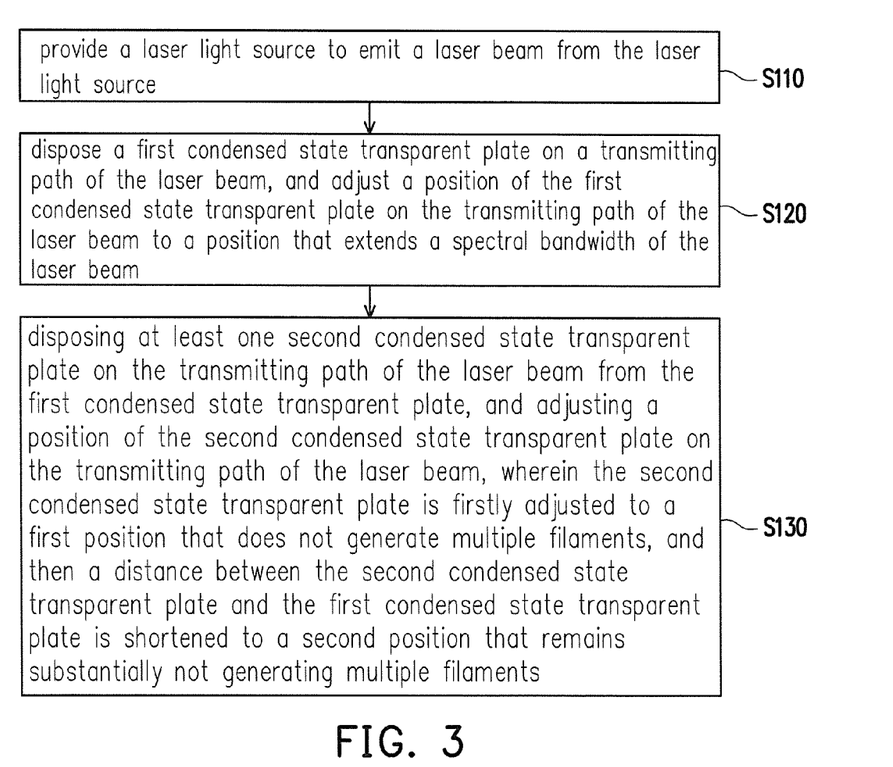
FIG. 3 is a flowchart illustrating an assembling method of a continuous spectrum generation apparatus according to an embodiment of the invention.

FIG. 3 is a flowchart illustrating an assembling method of a continuous spectrum generation apparatus according to an embodiment of the invention. Referring to FIGS. 1 and 3, the assembling method of the continuous spectrum generation apparatus according to the embodiment may be used to assemble the continuous spectrum generation apparatus 100 shown in FIG. 1 or continuous spectrum generation apparatuses of other embodiments. In the following, relevant details are provided by describing assembly of the continuous spectrum generation apparatus 100 shown in FIG. 1 as an example. The assembling method of the continuous spectrum generation apparatus of this embodiment includes steps as follows. First of all, as shown in Step S110, the laser light source 110 is provided, and the laser light source 110 emits the laser beam 112. Then, as shown in Step S120, a first condensed state transparent plate (i.e., the condensed state transparent plate 120a) is disposed on the transmitting path of the laser beam 112, and the position of the condensed state transparent plate 120a on the transmitting path of the laser beam is adjusted to a position that extends the spectral bandwidth of the laser beam 112. For example, the convergent lens 130 may be used to converge the laser beam 112 emitted from the laser light source 110, and the condensed state transparent plate 120a is substantially adjusted to the position at or near the beam waist of the laser beam 112.

Then, as shown in Step S130, at least one second condensed state transparent plate (e.g., the condensed state transparent plates 120b, 120c, and 120d) is disposed on the transmitting path of the laser beam 112 from the first condensed state transparent plate (i.e., the condensed state transparent plate 120a), and a position of the second condensed state transparent plate on the transmitting path of the laser beam 112 is adjusted. The second condensed state transparent plate is firstly adjusted to a first position P1 that does not generate multiple filaments, and then a distance between the second and first condensed state transparent plates is shortened to a second position P2 that is the nearest distance to the first condensed state transparent plate that substantially does not generate multiple filaments, and a third position P3 that the condensed state transparent plate generates multiple filaments or cause material damage is at the left of the second position P2 as shown in FIG. 1. For example, the condensed state transparent plates 120b, 120c, and 120d are respectively adjusted to the corresponding first positions P1 (i.e., the respective positions P1 at the right, as shown in FIG. 1), and then respectively adjusted to the corresponding second positions P2 to the left of P1 shown in FIG. 1, and the corresponding second positions P2 are respectively at the right of the third positions P3 that the condensed state transparent plates 120b, 120c, and 120d generate multiple filaments or cause material damage. In some embodiment, there is no third position that the condensed state transparent plate 120a generates multiple filaments or cause material damage at the left of the condensed state transparent plate 120a, i.e., at the left the second position P2 corresponding to the condensed state transparent plate 120a shown in FIG. 1. However, in some other embodiments, a third position P3 that the condensed state transparent plate 120a generates multiple filaments or cause material damage may be at the left of the condensed state transparent plate 120a, i.e., at the left of the second position P2 corresponding to the condensed state transparent plate 120a shown in FIG. 1.

Specifically, in this embodiment, the number of the second condensed state transparent plate is plural, for example, and includes the condensed state transparent plates 120b, 120c, and 120d, for example. After the condensed state transparent plate 120b closest to the condensed state transparent plate 120a is adjusted from the corresponding first position P1 to the corresponding second position P2, position adjustment to any one of the second condensed state transparent plates (i.e., any one of the condensed state transparent plates 120b, 120c, and 120d) other than the second condensed state transparent plate closest to the first condensed state transparent plate includes steps as follows. First of all, any one (e.g., the condensed state transparent plate 120c) of the second condensed state transparent plates is adjusted to a position that the laser beam 112 from the previous second condensed state transparent plate (e.g., the condensed state transparent plate 120b) substantially does not generate multiple filaments (e.g., the first position P1 at the right side of the condensed state transparent plate 120b, as shown in FIG. 1). Then, a distance from the any one (e.g., the condensed state transparent plate 120c) of the second condensed state transparent plates to the previous second condensed state transparent plate (e.g., the condensed state transparent plate 120b) is reduced to another position that still does not generate multiple filaments (e.g., the second position P2 where the condensed state transparent plate 120c is disposed, as shown in FIG. 1).

In the continuous spectrum generation apparatus 100 of this embodiment, since the condensed state transparent plates 120 are disposed on the transmitting path of the laser beam 112 in sequence, so as to successively and sequentially extend the spectral bandwidth of the laser beam 112, the continuous spectrum generation apparatus 100 may generate a reliable continuous spectrum with a preferable quality, such as a supercontinuum. In the assembling method of the continuous spectrum generation apparatus according to this embodiment of the invention, since the condensed state transparent plate 120 is adjusted to the position that does not generate multiple filaments, the continuous spectrum generation apparatus 100 assembled accordingly is capable of generating a reliable continuous spectrum with a preferable quality. Besides, since the condensed state transparent plates 120 are adjusted to the positions that do not generate multiple filaments, it is less likely to damage the condensed state transparent plates 120 during long-term use of the continuous spectrum generation apparatus 100, thereby increasing the lifetime and reliability of the continuous spectrum generation apparatus 100.

In this embodiment, the condensed state transparent plates 120 are fused quartz glass plates, for example, and a thickness of each of the condensed state transparent plates 120 is less than or equal to 0.5 mm. However, in other embodiments, the condensed state transparent plates 120 may also be formed of other transparent dielectric or semiconductor materials. For example, the material of the condensed state transparent plate 120 meets the following criterion: a photon energy of the laser beam 112 emitted from the laser light source 110 is less than or equal to a half of a bandgap of the condensed state transparent plate 120. In an embodiment, the material of the condensed state transparent plate 120 meets the following criteria: the photon energy of the laser beam 112 emitted from the laser light source 110 is greater than or equal to one-third of the bandgap of the condensed state transparent plate 120, and is less than or equal to a half of the bandgap of the condensed state transparent plate 120. Generally speaking, in the conventional supercontinuum generation technology, the photon energy of the laser beam is not greater than or equal to one-third of a bandgap of a medium (e.g., a solid-state, liquid state, or gaseous medium) that is used. Otherwise, a bandwidth-extending effect is not preferable. However, the optical framework of this embodiment is not under the limitation of the conventional technology. Namely, the material of the condensed state transparent plate 120 meets the following criteria: the photon energy of the laser beam 112 emitted from the laser light source 110 is greater than or equal to one-third of the bandgap of the condensed state transparent plate 120 and less than or equal to a half of the bandgap of the condensed state transparent plate 120. In other words, this embodiment effectively improves an applicability of the supercontinuum generation technology. However, in other embodiments, the material of the condensed state transparent plate 120 may also meet the following criterion: the photon energy of the laser beam 112 emitted from the laser light source 110 is less than one-third of the bandgap of the condensed state transparent plate 120. The condensed state transparent plate 120 within this range is also applicable in the continuous spectrum generation apparatus 100 of this embodiment or the continuous spectrum generation apparatuses of other embodiments.

In addition, compared with the conventional supercontinuum generation technology using a gaseous medium, requiring that an energy of a laser beam emitted to the gaseous medium is greater than approximately 1000 micro-joules, an energy of the laser beam 112 of the continuous spectrum generation apparatus 100 of this embodiment may be lower than 1000 micro-joules but still maintains a preferable bandwidth-extending effect. For example, the bandwidth-extending effect is preferable when the energy is in a range of 1 micro-joule to approximately 1000 micro-joule. In this way, the applicability of the continuous spectrum generation apparatus 100 is effectively improved.

To increase an output power of the continuous spectrum generation apparatus 100 and reduce a proportion of the laser beam 112 reflected by the condensed state transparent plates 120, in this embodiment, each of the condensed state transparent plates 120 may be disposed in a tilted state with respect to the laser beam 112. At this time, a polarized direction of the laser beam 112 may be adjusted to a P-polarized direction with respect to the condensed state transparent plates 120, so as to reduce the proportion of the laser beam 112 reflected by the condensed state transparent plates 120. In an embodiment, an included angle between the normal of each of the condensed state transparent plates 120 (i.e., the normal of an incident surface) and the laser beam 112 is approximately or substantially a Brewster's angle. Thus, a transmittance of the laser beam 112 in the P-polarized direction is able to be effectively increased.

To reduce dispersion of the light beam 114 output by the continuous spectrum generation apparatus 100, in this embodiment, tilting directions of the normals of two adjacent ones of the condensed state transparent plates 120 may be opposite, as shown in FIG. 1. However, the invention is not limited thereto. In other embodiments, the laser beam 112 may also be vertically emitted into the condensed state transparent plates 120. Or, based on practical needs, the normals of two adjacent ones of the condensed state transparent plates 120 may also be designed so that tilting directions of the normals of the two adjacent ones of the condensed state transparent plates 120 with respect to the laser beam 112 are the same.

The laser light source 110 of this embodiment may be various kinds of laser light sources. In FIG. 1, a chirped-pulse amplification laser serves as an example. The chirped-pulse amplification laser light source includes a pump laser 118, an optical amplifier 119, and an oscillator 116. The pump laser light source 118 emits a pump light beam 111 to the optical amplifier 119. The optical amplifier 119 amplifies a light beam 113 output by the oscillator 116 to form the laser beam 113. In this embodiment, the laser light source 110 is a pulsed laser light source, for example, and the laser beam 112 is a pulsed laser beam, for example.

Figure 4:
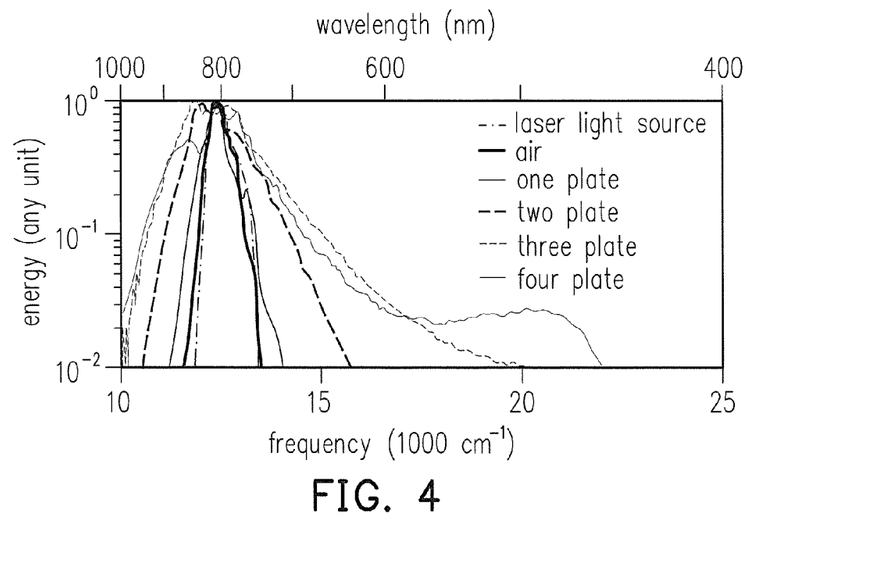
FIG. 4 is a spectrum of a laser beam of the continuous spectrum generation apparatus shown in FIG. 1 at different stages.

FIG. 4 is a spectrum of a laser beam of the continuous spectrum generation apparatus shown in FIG. 1 at different stages. Referring to FIGS. 1 and 4, a curve labeled as "laser light source" in FIG. 4 indicates a spectrum of the laser beam 112 emitted by the laser light source 110, a curve labeled as "air" indicates a spectrum generated after the laser beam 112 passes through only air, a curve labeled as "one plate" indicates a spectrum generated after the laser beam 112 passes through only one of the condensed state transparent plates 120 and the air, a curve labeled as "two plates" indicates a spectrum generated after the laser beam 112 passes through only two of the condensed state transparent plates 120 and the air, a curve labeled as "three plates" indicates a spectrum generated after the laser beam 112 passes through only three of the condensed state transparent plates 120 and the air, and a curve labeled as "four plates" is a spectrum generated after the laser beam 112 passes through four of the condensed state transparent plates 120 and the air. In relevant experimentation concerning FIG. 4, a pulse energy of the laser beam 112 is 140 micro-joule, for example, and the thickness of the condensed state transparent plate 120 is 0.5 micrometer, for example. As clearly indicated in FIG. 4, each time one condensed state transparent plate 120 is added, the spectral bandwidth of the output light beam 114 is extended. In particular, the spectral bandwidth is extended toward the higher frequency (e.g., toward blue light). The bandwidth-extending effect is not obvious if the fifth condensed state transparent plate 120 is added in this embodiment. One reason is that the light beam at this time is already quite divergent, and another reason is a characteristic of the material. However, when the laser beam 112 is emitted into the condensed state transparent plate 120, since a refractive index distribution of the condensed state transparent plate 120 is changed to thus produce an effect of self-focusing, the laser beam 112 may be prevented from being divergent as much as possible when being transmitted to the next condensed state transparent plate 120. Also, as shown in FIG. 4, the continuous spectrum generation apparatus 100 of this embodiment is capable of generating a white light continuous spectrum.

Also, a bandwidth-extending mechanism of the condensed state transparent plate 120 may be a self-phase modulation bandwidth-extending mechanism, a self-steepening bandwidth-extending mechanism, or any other bandwidth-extending mechanisms suitable for generating a supercontinuum.

Moreover, in other embodiments, the number of the condensed state transparent plates 120 is not limited. In some embodiments, to meet some requirements, the number of the condensed state transparent plates 120 may be two or more. Also, it is not necessary to maximally extend the spectral bandwidth, as long as the requirements are met. Besides, based on difference in wavelength of the laser beam 112 or other parameters, as well as different materials of the condensed state transparent plate 120 and the distance of the condensed state transparent plate 120, the number of condensed state transparent plates 120 required to maximally extend the spectral bandwidth may also differ. Thus, an appropriate amount of the condensed state transparent plates 120 may be used to meet the requirements, and the invention is not limited to the example shown in FIG. 1.

In view of the foregoing, in the continuous spectrum generation apparatus according to the embodiments of the invention, since the condensed state transparent plates are disposed on the transmitting path of the laser beam in sequence to successively and sequentially extend the spectral bandwidth of the laser beam, the continuous spectrum generation apparatus may generate a reliable continuous spectrum with a preferable quality. In the assembling method of the continuous spectrum generation apparatus according to the embodiments of the invention, since the condensed state transparent plate is adjusted to the position that does not generate multiple filaments, the continuous spectrum generation apparatus assembled accordingly is capable of generating a reliable continuous spectrum with a preferable quality.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A continuous spectrum generation apparatus, comprising:
    a laser light source, configured to emit a laser beam; and
    a plurality of condensed state transparent plates, disposed on a transmitting path of the laser beam in sequence, and configured to successively and sequentially expand a spectral bandwidth of the laser beam inputted into the condensed state transparent plates, wherein a photon energy of the laser beam emitted from the laser light source is less than or equal to a half of a bandgap of the condensed state transparent plate.

2. The continuous spectrum generation apparatus as claimed in claim 1, wherein the photon energy of the laser beam emitted from the laser light source is greater than or equal to one-third of the bandgap of the condensed state transparent plate.

3. The continuous spectrum generation apparatus as claimed in claim 1, wherein the condensed state transparent plate is a fused quartz glass plate.

4. The continuous spectrum generation apparatus as claimed in claim 1, wherein a thickness of each of the condensed state transparent plates is less than or equal to 0.5 mm.

5. The continuous spectrum generation apparatus as claimed in claim 1, wherein each of the condensed state transparent plates is disposed in a tilted state with respect to the laser beam.

6. The continuous spectrum generation apparatus as claimed in claim 5, wherein an included angle between the normal of each of the condensed state transparent plates and the laser beam is a Brewster's angle.

7. The continuous spectrum generation apparatus as claimed in claim 1, wherein one of the condensed state transparent plates closest to the laser light source is disposed at a position suitable to expand the spectral bandwidth of the laser beam.

8. The continuous spectrum generation apparatus as claimed in claim 7, wherein the one of the condensed state transparent plates closest to the laser light source is substantially disposed at a beam waist of the laser beam.

9. The continuous spectrum generation apparatus as claimed in claim 7, wherein a distance from any one of remainder of the condensed state transparent plates to the laser light source is greater than a distance from a position that the condensed state transparent plate generates multiple filaments or cause material damage, and the distance is a distance along the transmitting path of the laser beam.

10. An assembling method of a continuous spectrum generation apparatus, comprising:
    providing a laser light source to emit a laser beam from the laser light source;
    disposing a first condensed state transparent plate on a transmitting path of the laser beam, and adjusting a position of the first condensed state transparent plate on the transmitting path of the laser beam to a position that expands a spectral bandwidth of the laser beam; and
    disposing at least one second condensed state transparent plate on the transmitting path of the laser beam from the first condensed state transparent plate, and adjusting a position of the second condensed state transparent plate on the transmitting path of the laser beam, wherein the second condensed state transparent plate is firstly adjusted to a first position that does not generate multiple filaments, and then a distance between the second condensed state transparent plate and the first condensed state transparent plate is shortened to a second position that remains substantially not generating multiple filaments.

11. The assembling method of the continuous spectrum generation apparatus as claimed in claim 10, wherein the at least one second condensed state transparent plate comprises a plurality of the second condensed state transparent plates, and position adjustment of any one of the second condensed state transparent plates except the second condensed state transparent plate closest to the first condensed state transparent plate comprises:
    adjusting a position of the any one of the second condensed state transparent plates to a position that the laser beam from the previous second condensed state transparent plate that does not generate multiple filaments, and then shortening a distance between the any one of the second condensed state transparent plates and the previous second condensed state transparent plate to another position that remains substantially not generating the multiple filaments.

12. The assembling method of the continuous spectrum generation apparatus as claimed in claim 10, wherein adjusting the position of the first condensed state transparent plate on the transmitting path of the laser beam to the position that extends the spectral bandwidth of the laser beam comprises substantially adjusting the first condensed state transparent plate to a beam waist position of the laser beam.

13. The assembling method of the continuous spectrum generation apparatus as claimed in claim 10, wherein the first condensed state transparent plate and the second condensed state transparent plate are fused quartz glass plates.

14. The assembling method of the continuous spectrum generation apparatus as claimed in claim 10, wherein a thickness of the first condensed state transparent plate is less than or equal to 0.5 mm, and a thickness of the second condensed state transparent plate is less than or equal to 0.5 mm.

15. The assembling method of the continuous spectrum generation apparatus as claimed in claim 10, wherein the first condensed state transparent plate is adjusted to a position tilted with respect to the laser beam, and the second condensed state transparent plate is adjusted to a position tilted with respect to the laser beam.

16. The assembling method of the continuous spectrum generation apparatus as claimed in claim 15, wherein the first condensed state transparent plate is adjusted to a position where an included angle between the normal of the first condensed state transparent plate and the laser beam is a Brewster's angle, and the second condensed state transparent plate is adjusted to a position where an included angle between the normal of the second condensed state transparent plate and the laser beam is a Brewster's angle.

17. The assembling method of the continuous spectrum generation apparatus as claimed in claim 10, wherein a photon energy of the laser beam emitted from the laser light source is less than or equal to a half of a bandgap of each of the first condensed state transparent plate and the second condensed state transparent plate.

18. The assembling method of the continuous spectrum generation apparatus as claimed in claim 17, wherein the photon energy of the laser beam emitted from the laser light source is greater than or equal to one-third of the bandgap of each of the first condensed state transparent plate and the second condensed state transparent plate.

* * * * *